United States Patent [19]

Carpenter, Jr.

[11] 3,840,207

[45] Oct. 8, 1974

[54] FLEXIBLE TUBE VALVE

[76] Inventor: Clarence W. Carpenter, Jr., 8610 Cedarbrake, Houston, Tex. 77055

[22] Filed: June 13, 1968

[21] Appl. No.: 736,773

[52] U.S. Cl.............. 251/5, 251/57, 137/513.5, 137/539
[51] Int. Cl............................................. F16k 7/07
[58] Field of Search........ 251/5, 57, 61.1, 172, 173, 251/175

[56] References Cited
UNITED STATES PATENTS

| | | | |
|---|---|---|---|
| 1,873,138 | 8/1932 | Mitchell | 251/5 |
| 2,622,620 | 12/1952 | Annin | 251/5 |
| 2,843,349 | 7/1958 | Meyer | 251/5 X |
| 2,997,860 | 8/1961 | Muffly | 251/57 X |
| 3,145,967 | 8/1964 | Gardner | 251/5 |

FOREIGN PATENTS OR APPLICATIONS 6,411,144 3/1965 Netherlands............................ 251/5

Primary Examiner—Martin P. Schwadron
Assistant Examiner—Richard Gerard
Attorney, Agent, or Firm—Donald Gunn

[57] ABSTRACT

In valves, improved apparatus incorporating a flexible tubing for controlling the flow of a fluid or fluids therethrough wherein the flexible tubing constrictively engages a movable valve body or core upon application of internal pressure to the tubing; said improved valve incorporating an annular flow path between the tube and the valve member which is closed on application of pressure internally to said tubing by suitable means, such as a piston-cylinder means or the like.

15 Claims, 3 Drawing Figures

FLEXIBLE TUBE VALVE

SUMMARY OF PROBLEM AND SOLUTION

This invention relates to a high pressure control valve, and more particularly to a valve of the flexible tube variety in which a tube is adapted to be constricted into sealing engagement around an internally located valve member. When the pressure within the tube is increased, expansion of the tube reduces or occludes the annular flow path normally existing about the valve member and adjacent to the tube. A valve of this type is particularly well suited for the transmission of fluids which have metal corrosives or abrasive characteristics or multi-phased flow.

To reduce or obviate the corrosive effect of fluids, synthetic resin materials have commonly been used before in the construction of valves or valve components. The synthetic resins and equivalents such as rubber or rubber products do not, however, inherently possess the requisite strengths, in tension, shear and compression to withstand the mechanical loads required in many types of valve construction. By way of example, the effectiveness of a plug valve depends on the valve's sealing ability wherein tapered surfaces of the plug and bore must mate with perfect closure. Practically all synthetic resins and related products are subject to plastic "creep," that is, debilitation of the material's mechanical integrity due to continuous contact with a corrosive liquid or abrasive mating surface. Thus, in subjecting a plug type valve to substantial pressures of abrasive or corrosive flow, the valve will sooner or later develop weaknesses at the mating surfaces and leakage will result.

The present invention incorporates a design which avoids the inherent disadvantages in synthetic materials such as nominal strength and plastic "creep," while at the same time taking advantage of the substantial benefits which such materials present in the fact that corrosive and abrasive resistance characteristics are properly utilized. Also, the inherent ease of yield associated with flexible materials provides infinite variation in valve opening without drag, friction or other unsatisfactory properties associated with normal solid valve materials. By way of contrast, conventional needle valves obtain infinite adjustment by means (valve trims) such as removable inserts each having a limited range, the set of valve trims requiring removal and installation from time to time. More specifically, the present structure provides a synthetic resin tubing surrounding a valve member through which the valve closing force is transmitted from suitable means in a manner to expand the tubing within a closed or constraining structure. By application of external pressure to the valve tubing, the latter is caused to constrictively engage the internal valve member to thereby close, or at least reduce the fluid passage through the valve. In this manner, the corrosion resistant nature of the synthetic resin tubing is fully realized, and at the same time, disadvantages attendant such materials including "creep" and lack of structural strength, are substantially eliminated. In this construction, the material itself serves mainly to transmit the valve's closing forces rather than actually creating or exerting a substantial force. The valve's closing force is derived from appropriate means, such as suitable piston-cylinder arrangement attached to the valve body, a hand valve, a straight connection with a fluid pressure source, or the like.

While valves operating on somewhat similar principles as above are readily recognized in U.S. Pat. No. 3,145,967, and 2,622,620, the present invention is summarized as including a valve member which cooperates with the pliable tubing to prevent extrusion of the tubing and resulting damage wherein the structure of the valve member maintains alignment, and is honed at its external surface. Moreover, the invention is summarized as providing full flow closure about the valve member to provide a structure which is sensitive to control pressure in a manner not previously known in the prior art. In further particular, the present valve incorporates flow tubes of solid or slotted construction or permeable material which substantially reduce the internal flow space to enable rapid response of the valve wherein the entry tubes support the pliable tube in a manner to prevent possible extrusion or pinching of the flexible member. Moreover, the configuration of the flexible tube permits simpler high volume valve assemblies than previous types.

Other features and advantages of the present invention will become more readily apparent from a reading of the following description of claims and drawings of a preferred embodiment of the invention incorporating several views, wherein:

Figure 1:
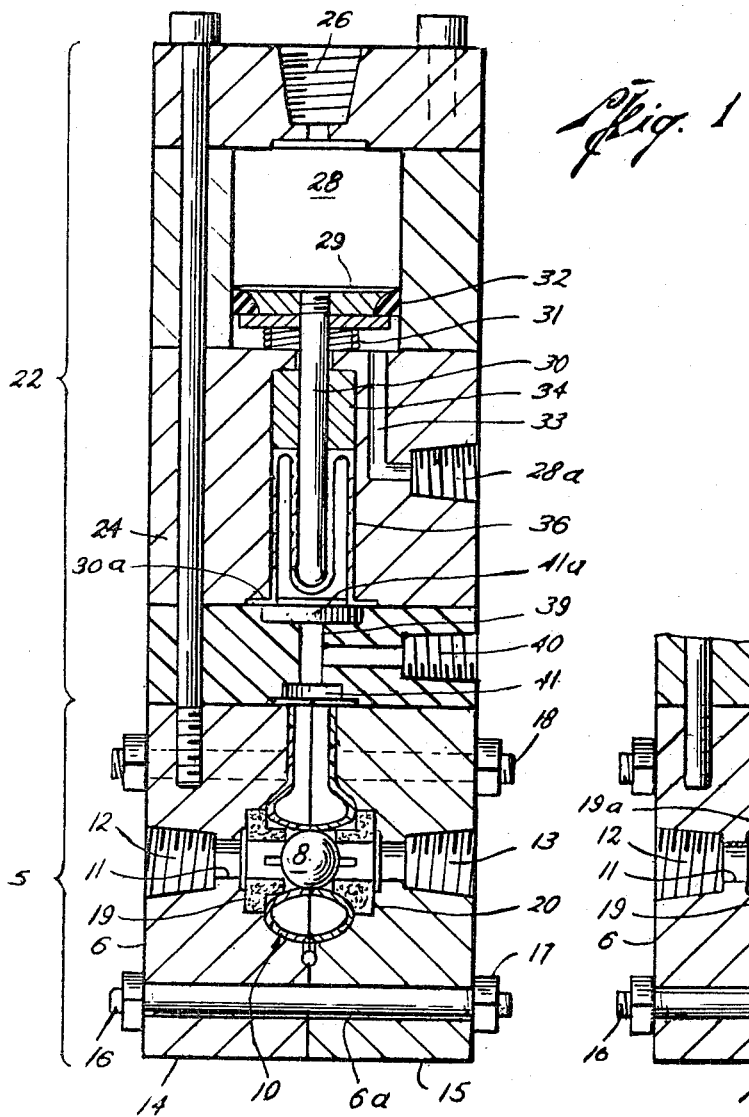
FIG. 1 is a sectional view through the valve structure of the present invention in the normally closed condition.
Figure 2:
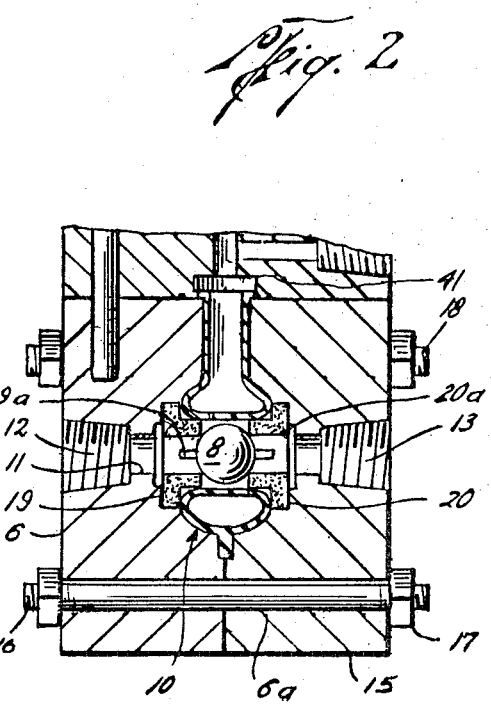
FIG. 2 is a partial view similar to FIG. 1 showing the valve in open condition; and, FIG. 3 is a view of the flexible member installed in the valve previously described.
Figure 3:
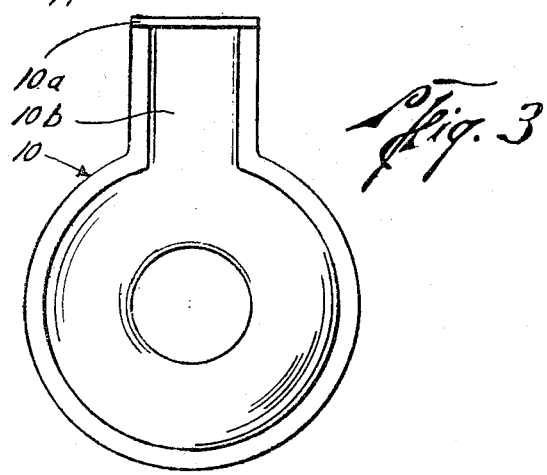

Attention is first directed to FIGS. 1 and 2 which show the valve of the present invention which is indicated by the numeral 5. The valve 5 incorporates a valve body 6 which surrounds a valve element 8. In the preferred embodiment, the valve element 8 is a spherical solid member which is received in a suitable cylindrical bore 11 which extends through the valve body 6. The valve member or element 8 is seated within an expansible and contractible tubing member 10 (see FIG. 3) which is adapted to be constricted in expansion and contraction by the valve body 6. The valve element 8 is preferably fully surrounded by the expansible member 10 to control the flow through the cylindrical bore 11 in the manner to be described.

Suitable tapped openings 12 and 13 communicate opposite ends of the transverse passage 11 with piping connections easily made to the valve 5. In actuality, ease of assembly dictates that the valve body 6 be formed of preferably symmetrical halves indicated by the numerals 14 and 15. The halves are preferably similar to one another and surround the expansible tube 10 as will be described. The halves 14 and 15 are joined to one another by means of a suitable stud bolt 16 positioned in a drilled opening 6a through the valve body 6 locked in position by a head nut 17. The nut 17 draws the two portions of the valve body 6 together.

A suitable number of stud bolts includes the lower bolt and the upper bolt 18.

Attention is next directed to the valve inserts 19 and 20 shown in the drawings. The inserts or valve seats 19 and 20 are received within the transverse bore 11 to seat the valve means 8 within the constricted flexible tubing 10. More specifically, the valve seats 19 and 20 are either of a solid or impervious material or are formed of a material such as a sintered metal bonded into a unitary structure porous to fluid.

As an alternative, FIG. 2 indicates flow slots 19a formed in the valve seat 19. Even though the element 8 is shown seated against the valve insert 19, flow past the valve 8 is accommodated through the slots 19. The slots in the insert have an equivalent cross-sectional area sufficient for the desired flow. The slots may be lengthened or shortened to alter the flow, and also, increased in number. On the use of porous or sintered inserts, the slots may be unnecessary.

Where maximum pressures are desired in clean fluid systems a cylindrical valve member closely fitting between two solid or porous valve seats will eliminate all chance of failure due to extrusion or pinch out of the flexible tube, providing safe operation up to the pressure rating of the valve body 6. The valve inserts 19 and 20 preferably lock the inflatable tube 10 in position. Appropriately shaped counter bore openings concentric with the tubular bore 11 are formed in the structural halves 14 and 15 to receive the valve seats. The valve seats cooperate to position the tubing 10. Preferably, all flow is directed through the axial opening 11 of the valve body 6.

To this juncture, little has been noted concerning the inflatable member 10. The member 10 is clamped between the two halves 14 and 15, and is more particularly secured in position by the inserts 19 and 20 at the valve element 8. The inserts 19 and 20 abut the outer faces of the tubing 10 as shown in the drawing. More particularly, the tubing 10 is supported about the greater portions of its external surface by the valve body halves 14 and 15. The inside wall of the tubing 10 rests on the valve member 8 to impede or resist flow of the fluid through the valve when the tube 10 is inflated.

In the preferred embodiment, the valve element is preferably a sphere. Other streamlined shapes may be used. At any event, the valve member is movably located within the chamber defined by the tubing 10 and the two valve halves 14 and 15. The spacing between the inlet and outlet inserts is such as to be no greater than perhaps the diameter of the valve element 8 plus perhaps one-fourth of its diameter. A more snug fit may be used, if desired. It will be appreciated that since the valve member 8 is free to at least rotate whenever the tube 10 is relaxed, the exterior surfaces of the valve member will be honed or polished by by contact with the tube so as to prevent burrs and the like from forming on the valve member.

From the foregoing, it will be noted that the tube 10 is substantially supported over its entire surface to prevent possible extrusion of the pliable material. It is difficult, if not impossible, to extrude the pliable tube into the space between the sphere and the inserts spaced from the valve sphere 8. This completely eliminates the danger of pinching through the pliable wall of the tubing 10. Moreover, the relationship of the valve element 8 to the closely spaced inlet and outlet entry members is such that the volumetric displacement required to open or close the valve is minimal. By way of example, should it be desired to close the valve 5 from the open position, there is a minimal quantity of fluid in the valve to be displaced either upstream or downstream of the valve as the tubing 10 expands. When using valves to which the present invention relates with an incompressible fluid and wherein valve position is determined by a controller responsive to upstream or downstream pressure, overshoot is a natural result of displacement of fluid in closing whereby the controller senses a misleading pressure indication of operation. The device of the present invention so substantially reduces volumetric displacement associated with its operation that overshoot is eliminated.

In many installations, the valve is either normally open or closed; as a consequence, the flexible tube 10 moves easily from contact with the valve member 8 at a substantially peripheral line of contact to define an annular flow path. In the closed or sealed position of FIG. 1, the flexible tube is constricted into sealing engagement with the valve element 8 so as to close the annular communication through the transverse cylindrical bore 11. Of course, the flexible tube provides minimum support to the valve element 8 when contacted thereagainst. More particularly, the instant before opening or closing, the valve provides optimum sensitivity because of the low inertia and easily moved resilient member, and essentially annular line of minimum contact. It is believed substantially easier to obtain quick opening or closure of the valve with the minimal surface of contact. This is somewhat akin to the difference in inertia of a large part as opposed to that of a small part, and the advantage of this factor is noted in the present embodiment.

The facing edges of the inserts 19 and 20 are rounded for contact against the valve element 8 to avoid pinching the tubing 10. Moreover, precise alignment of the valve element 8 is attained when the sphere seats itself in the manner illustrated. The tubing material, because of its flexibility, tends to distend around the valve element 8; however, the present invention avoids pinching of the tubing to maintain its fluid integrity. At this juncture, it is noteworthy that the inserts 19 and 20 are suitably shaped for receiving the valve element thereagainst without pinching.

If desired, either of the inserts may be made of non-porous material. This then incorporates a check valve feature in the present structure. By way of example, should the insert 19 be formed of a non-porous material and without slots, back pressure from the right as viewed in FIG. 1 moves the valve element 8 against the insert 19 to close off fluid flow through the valve in the manner desired for check valves. Of course, the check valve arrangement can be duplicated on the opposite side. If greater flow is required through the valve, inserts 19 and 20 may be of substantially large diameter porous members, their diameter limited only by the necessity for leak proof seals at the periphery of tube member 10.

While any suitable means may be adapted to control fluid for opening and closing the valve 5, operation of the fluid amplifier section will be incorporated in the present description as a suitable teaching.

In FIGS. 1 and 2, a fluid amplifier body 22 is mounted on the valve body 6. It is joined thereto by suitable threaded bolts 24. A tapped opening 26 is adapted to receive a control pressure fluid from an appropriately threaded piping or pilot conduit as desired. The opening 26 permits gas communication to a chamber 28. Within the chamber 28 is located a piston 29 which moves in the chamber in response to fluid pressure. The piston 29 is connected to a push rod 30. A return spring 31 beneath the piston 29 tends to return the piston 29 to a quiescent position in the absence of fluid pressure. Fluid leakage past the piston 29 is vented through tapped opening 28A which opening may also be used to provide a gas spring under piston 29 in lieu of spring 31.

The piston 29 includes a fixed lower section and a movable upper section capturing a split or spiral teflon wiper ring 32. This provides an adjustable seal to the cylinder with little or no resistance to movement. By properly adjusting the piston, sufficiently tight fit of the wiper ring is attained to transmit the fluid pressure to the push rod 30 while the slippage of gas past the ring and the frictionless movement of the wiper ring itself tends to eliminate all drag on the piston.

The lower end of the chamber 28 is vented by a passage 33 to atmosphere to prevent accumulation of back pressure on movement of the piston 29.

A guide bushing 34 surrounds the piston rod 30 and maintains proper movement. The piston rod 30 extends into a resilient member 36 of a closed fluid system. Upward movement of the piston rod 30 relieves pressure within the closed fluid system. On the other hand, the fluid chamber within the resilient means 36 is communicated by a passage 39 to the flexible tubing 10. As shown, the passage 39 is directed to the single inlet or opening in the tubing 10 and the fluid in the closed system is pressured by movement of the piston 29 to act fully on the tubing 10.

The passage 39 communicates by way of a tapped opening 40 to an outlet to provide a means for charging the closed fluid system. Preferably, an incompressible fluid is admitted through the passage 40 to fill the tubing 10 and the chamber adjacent the diaphragm 36. The closed fluid passage is not contaminated by the fluid flowing through the valve, bearing in mind the fact that the fluid is typically polluted with corrosive or abrasive materials and is often of mixed phase flow.

The closed fluid system is integrally defined by a flange 36a which is clamped fully about the diaphragm 36 on assembly of the fluid amplifier. In like fashion, the numeral 10a indicates a similar flange on the tubing 10 which is also clamped to prevent leakage from the closed system. In the illustrated embodiment, the fluid system is completely open between the diaphragm 36 and the tubing 10. If desired, a porous plug 41 is incorporated above the neck 10a of the tubing to prevent extrusion of the tube 10 on occurrence of a failure of the operating pressure at a time when the valve is under internal pressure. Similarly, a porous plate 41a prevents extrusion of the diaphragm 36 when using direct fluid pressure operation.

The fluid amplifier shown in the drawing multiplies the control pressure. To pose an example, suppose that a control pressure is available up to 500 psi. Further, suppose the pressure of the fluid flow to be controlled by the present valve ranges as high as 4,000 psi. The ratio of the cross-sectional area of the piston 29 exposed to the control pressure to the cross-sectional area of the piston rod 30 yields a multiplier which, when applied to the control pressure variations, provides suitable pressure within the tubing 10 to close the valve 5. Since the circumstances of installation of the present valve may vary widely, the ratio is preferably selected in view of the circumstances of installation to provide adequate closing forces within the tubing 10.

In operation of the valve proper, the application of fluid pressure within the tubing 10 closes the valve. It should be noted that the tubing 10 is supported at all walls so that it merely transfers the force of the fluid therein and does not serve a structural function. More specifically, FIG. 1 shows the wall of the tubing 10 distorting to rest against the contours of surrounding structure. Again, no load bearing function requiring strength in compression, tension, or shear is required. Therefore, fatigue or "creep" of the resilient material has no effect on its operation during a repeated number of operations over a long period of time.

Transit time is clearly reduced through the use of the valve of the present structure. This results from the use of the closed fluid system coupling the closing force to the valve member and through the further use of the arrangement whereby fluid trapped within the valve is minimal, and through the use of a smoothly contoured valve member 8 which provides a minimal line of contact closure. Since it is not necessary to force fluid upstream or downstream on closing, the valve is able to close with minimal transit time and re-open rapidly.

While the foregoing illustrates and describes the preferred embodiment of the present invention, it will be recognized that other forms are feasible. For example, the expansible and contractible tubing member 10 may incorporate other embodiments such that surfaces most removed, and not necessary for constriction on the valve member 8, may be of substantially harder material such as metals, such as to provide most efficient and economical construction of the total unit.

While the foregoing describes certain alterations, the scope of the present invention is determined by the claims appended hereto, and shall include such changes and alterations as fall within the scope thereof.

What is claimed is:

1. A valve comprising:

a body having an interior cavity arranged about a selected axis;

inlet and outlet fluid passage means in said body including opposed first and second tubular projections coaxially arranged about said axis and extending into said cavity toward one another;

an imperforate member having an intermediate portion with a circular transverse cross section loosely disposed in said cavity in coincidental alignment with said opposed tubular projections and adapted for movement relative thereto;

a resilient pressure-responsive member having an unsupported intermediate portion coaxially arranged in said cavity to enclose said imperforate member and adapted for movement into and out of sealing engagement with said intermediate portion of said imperforate member for controlling flow between said fluid passage means and other portions secured to said body and fluidly sealed in relation thereto for defining an enclosed annular space within said cavity around the exterior of said unsupported intermediate portion; and means including a passage in said body adapted to admit pressured fluids into said enclosed annular space for selectively distending said intermediate portion of said resilient member into sealing engagement with said intermediate portion of said imperforate member to block fluid flow between said inlet and outlet passage means.

2. The valve of claim 1 wherein said imperforated member is spherical.

3. The valve of claim 1 wherein said first tubular projection terminates in an annular seat coaxially disposed about said axis; and said imperforate member is free to move axially between said opposed projections and has an end portion complementally shaped for seating engagement with said annular seat upon movement of said end portion against said first tubular projection.

4. The valve of claim 1 wherein said imperforate member is spherical and is free to move axially between said opposed projections; and said first tubular projection terminates in an annular seat coaxially disposed about said axis and complementally shaped for seating engagement by said imperforate member whenever it moves into contact with said annular seat.

5. The valve of claim 1 wherein said first tubular projection has at least one lateral passage opening into said cavity.

6. The valve of claim 1 wherein at least said first tubular projection includes a porous portion.

7. The valve of claim 1 wherein said intermediate portion of said resilient member is generally toroidal and said other portions of said resilient member include a tubular portion in communication with said toroidal portion and extending laterally therefrom along said body passage.

8. The valve of claim 7 wherein the walls of said cavity adjacent to said toroidal portion of said resilient member are complementally shaped to support the exterior of said toroidal portion.

9. The valve of claim 8 wherein said opposed tubular projections are partially extended into said unsupported intermediate portion of said resilient member to support adjacent surfaces thereof upon distension of said resilient member.

10. The valve of claim 9 wherein said first tubular projection has at least one lateral passage opening into said cavity.

11. The valve of claim 9 wherein at least said first tubular projection includes a porous portion.

12. The valve of claim 9 wherein said imperforate member is spherical.

13. The valve of claim 9 wherein said first tubular projection terminates in an annular seat coaxially disposed about said axis; and said imperforate member is free to move axially between said opposed projections and has an end portion complementally shaped for seating engagement with said annular seat upon movement of said end portion against said first tubular projection.

14. The valve of claim 9 wherein said imperforate member is spherical and is free to move axially between said opposed projections; and said first tubular projection terminates in an annular seat coaxially disposed about said axis and complementally shaped for seating engagement by said imperforate member whenever it moves into contact with said annular seat.

15. The valve of claim 14 wherein at least said first tubular projection includes a porous portion.

* * * * *